(12) United States Patent
Jayawardena et al.

(10) Patent No.: US 10,383,191 B2
(45) Date of Patent: Aug. 13, 2019

(54) FAIL-SAFE LIGHTING CONTROL SYSTEM

(71) Applicants: Adikaramge Asiri Jayawardena, Manlius, NY (US); Sonal Satish Tanksale, Pune (IN); Abhay Raosaheb Shinde, Pune (IN); Arpita Jain, Pune (IN); Pulak Purkait, Pune (IN)

(72) Inventors: Adikaramge Asiri Jayawardena, Manlius, NY (US); Sonal Satish Tanksale, Pune (IN); Abhay Raosaheb Shinde, Pune (IN); Arpita Jain, Pune (IN); Pulak Purkait, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 280 days.

(21) Appl. No.: 15/361,663

(22) Filed: Nov. 28, 2016

(65) Prior Publication Data
US 2017/0156189 A1    Jun. 1, 2017

Related U.S. Application Data

(60) Provisional application No. 62/261,123, filed on Nov. 30, 2015.

(51) Int. Cl.
*H02J 9/06* (2006.01)
*H05B 33/08* (2006.01)
*H05B 37/02* (2006.01)

(52) U.S. Cl.
CPC ......... *H05B 33/0884* (2013.01); *H02J 9/061* (2013.01); *H05B 33/0842* (2013.01); *H05B 33/0845* (2013.01); *H05B 37/0218* (2013.01); *H05B 37/0227* (2013.01); *H05B 37/0272* (2013.01); *H02J 9/065* (2013.01); *Y02B 20/46* (2013.01)

(58) Field of Classification Search
CPC .................. H03B 33/0845; H03B 33/0884
See application file for complete search history.

(56) References Cited

U.S. PATENT DOCUMENTS

| | | | |
|---|---|---|---|
| 8,829,797 B2 | 9/2014 | McMahon | |
| 2010/0135000 A1 | 6/2010 | Smith, III et al. | |
| 2011/0095704 A1 | 4/2011 | Moussakov et al. | |
| 2012/0143357 A1 | 6/2012 | Chemel et al. | |
| 2013/0200807 A1* | 8/2013 | Mohan | H05B 37/02 315/151 |
| 2014/0375206 A1 | 12/2014 | Holland et al. | |
| 2015/0115807 A1 | 4/2015 | Schroder et al. | |

OTHER PUBLICATIONS

S.Surikov, International Search Report and Written Opinion of the International Searching Authority for PCT/US2016/063815, completion date Mar. 17, 2017, dated Mar. 23, 2017, 8 pages, Federal Institute of Industrial Property, Russia, Moscow.

* cited by examiner

*Primary Examiner* — Jeffrey M Shin
(74) *Attorney, Agent, or Firm* — King & Spalding LLP

(57) ABSTRACT

A light fixture can include at least one light source, and at least one power supply that receives primary power, where the at least one power source generates final power using the primary power, where the at least one power supply delivers the final power to the at least one light source. The light fixture can also include a controller coupled to the at least one power supply, where the controller detects an adverse event, and where the controller controls the at least one power supply to provide the final power to the at least one light source during the adverse event.

20 Claims, 11 Drawing Sheets

FAIL-SAFE LIGHTING CONTROL SYSTEM

CROSS-REFERENCE TO RELATED APPLICATIONS

This application claims priority under 35 U.S.C. § 119 to U.S. Provisional Patent Application Ser. No. 62/261,123, titled "Fail-Safe Lighting Control System" and filed on Nov. 30, 2015, the entire contents of which are hereby incorporated herein by reference.

TECHNICAL FIELD

The present disclosure relates generally to control systems for light fixtures, and more particularly to systems, methods, and devices for fail-safe control systems for light fixtures.

BACKGROUND

In safety-critical lighting applications, such as hazardous environments, reliability of the lighting system is vital. Unfortunately, the characteristics (e.g., humidity, extreme temperatures, corrosive gas) of these environments can cause traditional control systems that are used to control light fixtures in such environments to fail or otherwise not function properly, which makes one or more of the light fixtures within the lighting system unreliable (e.g., unavailable, unable to be controlled).

SUMMARY

In general, in one aspect, the disclosure relates to a light fixture. The light fixture can include at least one light source. The light fixture can also include at least one power supply that receives primary power, where the at least one power source generates final power using the primary power, where the at least one power supply delivers the final power to the at least one light source. The light fixture can further include a controller coupled to the at least one power supply, where the controller detects an adverse event, and where the controller controls the at least one power supply to provide the final power to the at least one light source during the adverse event.

In another aspect, the disclosure can generally relate to a lighting system. The lighting system can include a first light fixture having at least one first light source, and at least one first power supply that receives first primary power, where the at least one first power source generates first final power using the first primary power, where the at least one first power supply delivers the first final power to the at least one first light source. The lighting system can also include a controller coupled to the at least one first power supply, where the controller detects a first adverse event, and where the controller controls the at least one first power supply to provide the first final power to the at least one first light source during the first adverse event.

In yet another aspect, the disclosure can generally relate to a controller for a light fixture. The controller can include a control engine coupled to a power supply of the light fixture, where the controller detects an adverse event, and where the controller controls the power supply to provide final power to at least one first light source of the light fixture during the first adverse event.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION

Figure 1:
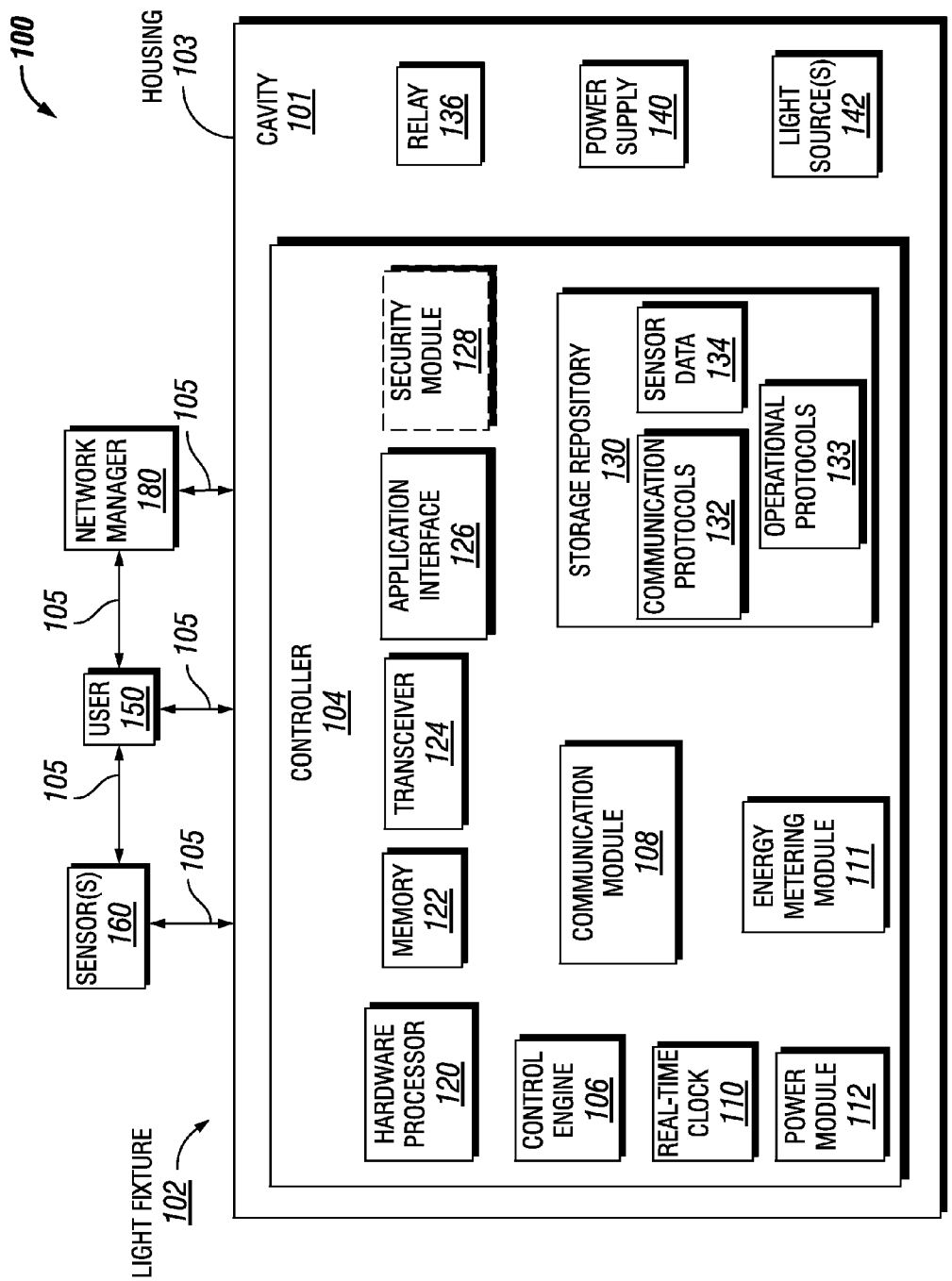
FIG. 1 shows a system diagram of a lighting system that includes a light fixture in accordance with certain example embodiments.

In general, example embodiments provide systems, methods, and devices for fail-safe lighting control systems for light fixtures. Example fail-safe lighting control systems for light fixtures provide a number of benefits. Such benefits can include, but are not limited to, increased reliability of light fixtures, increased security against hackers, reduced power consumption, improved communication efficiency, ease of maintenance, and compliance with industry standards that apply to light fixtures located in certain environments.

In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill. A user may be any person that interacts with light fixtures having example fail-safe lighting control systems. Examples of a user may include, but are not limited to, an engineer, an electrician, an instrumentation and controls technician, a mechanic, an operator, a hacker, a consultant, a contractor, and a manufacturer's representative.

The example light fixtures having fail-safe lighting control systems (or components thereof, including controllers) described herein can be made of one or more of a number of suitable materials to allow the light fixture and/or other associated components of a system to meet certain standards and/or regulations while also maintaining durability in light of the one or more conditions under which the light fixtures and/or other associated components of the system can be exposed. Examples of such materials can include, but are not limited to, aluminum, stainless steel, fiberglass, glass, plastic, ceramic, and rubber.

Example light fixtures having fail-safe lighting control systems, or portions thereof, described herein can be made from a single piece (as from a mold, injection mold, die cast, or extrusion process). In addition, or in the alternative, example light fixtures having fail-safe lighting control systems can be made from multiple pieces that are mechanically coupled to each other. In such a case, the multiple pieces can be mechanically coupled to each other using one or more of a number of coupling methods, including but not limited to, epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

In the foregoing figures showing example embodiments of fail-safe lighting control systems for light fixtures, one or more of the components shown may be omitted, repeated, and/or substituted. Accordingly, example embodiments of fail-safe lighting control systems for light fixtures should not be considered limited to the specific arrangements of components shown in any of the figures. For example, features shown in one or more figures or described with respect to one embodiment can be applied to another embodiment associated with a different figure or description.

As defined herein, an electrical enclosure is any type of cabinet or housing inside of which is disposed electrical and/or electronic equipment. Such electrical and/or electronic equipment can include, but is not limited to, a controller (also called a control module), a hardware processor, a power supply (e.g., a battery, a driver, a ballast), a sensor module, a safety barrier, a sensor, sensor circuitry, a light source, electrical cables, and electrical conductors. Examples of an electrical enclosure can include, but are not limited to, a housing for a light fixture, a housing for a sensor device, an electrical connector, a junction box, a motor control center, a breaker box, an electrical housing, a conduit, a control panel, an indicating panel, and a control cabinet.

In certain example embodiments, light fixtures having fail-safe lighting control systems are subject to meeting certain standards and/or requirements. For example, the National Electric Code (NEC), the National Electrical Manufacturers Association (NEMA), the International Electrotechnical Commission (IEC), the Federal Communication Commission (FCC), and the Institute of Electrical and Electronics Engineers (IEEE) set standards as to electrical enclosures, wiring, and electrical connections. Use of example embodiments described herein meet (and/or allow a corresponding device to meet) such standards when required. In some (e.g., PV solar) applications, additional standards particular to that application may be met by the electrical enclosures described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of fail-safe lighting control systems for light fixtures will be described more fully hereinafter with reference to the accompanying drawings, in which example embodiments of fail-safe lighting control systems for light fixtures are shown. Fail-safe lighting control systems for light fixtures may, however, be embodied in many different forms and should not be construed as limited to the example embodiments set forth herein. Rather, these example embodiments are provided so that this disclosure will be thorough and complete, and will fully convey the scope of fail-safe lighting control systems for light fixtures to those of ordinary skill in the art. Like, but not necessarily the same, elements (also sometimes called components) in the various figures are denoted by like reference numerals for consistency.

Terms such as "first", "second", and "within" are used merely to distinguish one component (or part of a component or state of a component) from another. Such terms are not meant to denote a preference or a particular orientation, and are not meant to limit embodiments of fail-safe lighting control systems for light fixtures. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system diagram of a lighting system 100 that includes a controller 104 of a light fixture 102 in accordance with certain example embodiments. The lighting system 100 can include one or more sensors 160 (also sometimes called sensor modules 160), a user 150, a network manager 180, and a light fixture 102. In addition to the controller 104, the light fixture 102 can include a power supply 140, a number of light sources 142, and a relay 136. The controller 104 can include one or more of a number of components. Such components, can include, but are not limited to, a control engine 106, a communication module 108, a real-time clock 110, a power module 112, a storage repository 130, a hardware processor 120, a memory 122, a transceiver 124, an application interface 126, and, optionally, a security module 128. The components shown in FIG. 1 are not exhaustive, and in some embodiments, one or more of the components shown in FIG. 1 may not be included in an example light fixture. Any component of the example light fixture 102 can be discrete or combined with one or more other components of the light fixture 102.

The user 150 is the same as a user defined above. The user 150 can use a user system (not shown), which may include a display (e.g., a GUI). The user 150 interacts with (e.g., sends data to, receives data from) the controller 104 of the light fixture 102 via the application interface 126 (described below). The user 150 can also interact with a network manager 180 and/or one or more of the sensors 160. Interaction between the user 150 and the light fixture 102, the network manager 180, and the sensors 160 is conducted using communication links 105. Each communication link 105 can include wired (e.g., Class 1 electrical cables, Class 2 electrical cables, electrical connectors) and/or wireless (e.g., Wi-Fi, visible light communication, cellular networking, Bluetooth, WirelessHART, ISA100, Power Line Carrier, RS485, DALI) technology. For example, a communication link 105 can be (or include) one or more electrical conductors that are coupled to the housing 103 of the light fixture 102 and to a sensor 160. The communication link 105 can transmit signals (e.g., power signals, communication signals, control signals, data) between the light fixture 102 and the user 150, the network manager 180, and/or one or more of the sensors 160.

The network manager 180 is a device or component that controls all or a portion of a communication network that includes the controller 104 of the light fixture 102 and the sensors 160 that are communicably coupled to the controller 104. The network manager 180 can be substantially similar to the controller 104. Alternatively, the network manager 180 can include one or more of a number of features in addition to, or altered from, the features of the controller 104 described below. As described herein, communication with the network manager 180 can include communicating with one or more other components (e.g., another light fixture) of the system 100. In such a case, the network manager 180 can facilitate such communication.

The one or more sensors 160 can be any type of sensing device that measure one or more parameters. Examples of types of sensors 160 can include, but are not limited to, a passive infrared sensor, a photocell, a pressure sensor, an air flow monitor, a gas detector, and a resistance temperature detector. A parameter that can be measured by a sensor 160 can include, but is not limited to, motion, an amount of ambient light, occupancy of a space, and an ambient temperature. In some cases, the parameter or parameters measured by a sensor 160 can be used to operate one or more light sources 142 of the light fixture 102. Each sensor 160 can use one or more of a number of communication protocols. A sensor 160 can be associated with the light fixture 102 or another light fixture in the system 100.

In certain example embodiments, a sensor 160 can include a battery that is used to provide power, at least in part, to some or all of the rest of the sensor 160. When the system 100 (or at least a sensor 160) is located in a hazardous environment, the sensor 160 can be intrinsically safe. As used herein, the term "intrinsically safe" refers to a device (e.g., a sensor described herein) that is placed in a hazardous environment. To be intrinsically safe, the device uses a limited amount of electrical energy so that sparks cannot occur from a short circuit or failures that can cause an explosive atmosphere found in hazardous environments to ignite. A safety barrier is commonly used with an intrinsically safe device, where the safety barrier limits the amount of power delivered to the sensor or other device to reduce the risk of explosion, fire, or other adverse condition or event that can be caused by high amounts of power in the hazardous environment. An adverse condition or event can also be an abnormal condition that is not potentially catastrophic in nature.

The user 150, the network manager 180, and/or the sensors 160 can interact with the controller 104 of the light fixture 102 using the application interface 126 in accordance with one or more example embodiments. Specifically, the application interface 126 of the controller 104 receives data (e.g., information, communications, instructions, updates to firmware) from and sends data (e.g., information, communications, instructions) to the user 150, the network manager 180, and/or each sensor 160. The user 150, the network manager 180, and/or each sensor 160 can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof The controller 104, the user 150, the network manager 180, and/or the sensors 160 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, sensor software, controller software, network manager software). The software can execute on the same or a separate device (e.g., a server, mainframe, desktop personal computer (PC), laptop, personal desktop assistant (PDA), television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 100.

The light fixture 102 can include a housing 103. The housing 103 can include at least one wall that forms a cavity 101. In some cases, the housing can be designed to comply with any applicable standards so that the light fixture 102 can be located in a particular environment (e.g., a hazardous environment). For example, if the light fixture 102 is located in an explosive environment, the housing 103 can be explosion-proof. According to applicable industry standards, an explosion-proof enclosure is an enclosure that is configured to contain an explosion that originates inside, or can propagate through, the enclosure.

Continuing with this example, the explosion-proof enclosure is configured to allow gases from inside the enclosure to escape across joints of the enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface.

The housing 103 of the light fixture 102 can be used to house one or more components of the light fixture 102, including one or more components of the controller 104. For example, as shown in FIG. 1, the controller 104 (which in this case includes the control engine 106, the communication module 108, the real-time clock 110, the power module 112, the storage repository 130, the hardware processor 120, the memory 122, the transceiver 124, the application interface 126, and the optional security module 128), the power supply 140, and the light sources 142 are disposed in the cavity 101 formed by the housing 103. In alternative embodiments, any one or more of these or other components of the light fixture 102 can be disposed on the housing 103 and/or remotely from the housing 103.

The storage repository 130 can be a persistent storage device (or set of devices) that stores software and data used to assist the controller 104 in communicating with the user 150, the network manager 180, and one or more sensors 160 within the system 100. In one or more example embodiments, the storage repository 130 stores one or more communication protocols 132, operational protocols 133, and sensor data 134. The communication protocols 132 can be any of a number of protocols that are used to send and/or receive data between the controller 104 and the user 150, the network manager 180, and one or more sensors 160. One or more of the communication protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 132 can provide a layer of security to the data transferred within the system 100.

The operational protocols 133 can be any algorithms, formulas, logic steps, and/or other similar operational procedures that the control engine 106 of the controller 104 follows based on certain conditions at a point in time. An example of an operational protocol 133 is gradually reducing power output by the power supply 140 to a minimal level when temperature within the cavity 101 of the light fixture 102 exceeds a certain threshold temperature. Another example of an operational protocol 133 is calibrating a sensor 160 to account for dust accumulation on the sensor 160 over time. This can be accomplished, for example, by capturing values measured by the sensor 160 with little or no dust accumulation (e.g., when newly installed), capturing values measured by the sensor 160 over time, and tracking changes in the measured values over time when there is no ambient light present. In such a case, the controller 104 can send an alarm to the user 150 when the dust accumulation on the sensor 160 reaches a certain level, where the alarm instructs the user 150 to clean the sensor 160. Yet another example of an operational protocol 133 is to check one or more communication links 105 with the network manager 180 and, if a communication link 105 is not functioning properly, allow the controller 104 to operate autonomously from the rest of the system 100.

As another example of an operational protocol 133, configurations of the controller 104 can be stored in memory 122 (e.g., non-volatile memory) so that the controller 104 (or portions thereof) can operate regardless of whether the controller 104 is communicating with the network controller 180 and/or other components in the system 100. Yet another example of an operational protocol 133 is obtaining readings from an adjacent sensor (as from an adjacent light fixture) if the sensor 160 associated with the light fixture 102 malfunctions, if the communication link 105 between the sensor 160 and the controller 104 fails, and/or for any other reason that the readings of the sensor 160 associated with the light fixture 102 fails to reach the controller 104. To accomplish this, for example, the network manager 180 can instruct the adjacent sensor 160 to communicate its readings to the controller 104 using communication links 105.

Still another example of an operational protocol 133 is identifying an adverse operating condition or event (e.g., overvoltage, undervoltage, voltage spikes, power surges) based on readings taken by part of the controller 104 (e.g., control engine 106, the power module 112). In such a case, the readings are captured using the energy metering module 111. The measurements from the energy metering module 111 along with dimming level settings can be used to detect failure of the light fixture 102. If the energy metering module 111 fails, another operational protocol 133 is to not run a failure mode analysis using the readings from the failed energy metering module 111 and/or to report the failed energy metering module 111 to the network manager 180. Yet another example of an operational protocol 133 is to have the controller 104 operate in an autonomous control mode if one or more components (e.g., the communication module 108, the transceiver 124) of the controller 104 that allows the controller 104 to communicate with another component of the system 100 fails.

Some operational protocols 133 can be directed to anti-hacking measures. For example, an operational protocol 133 can require that a dimming signal (e.g., command) sent to the control engine 106 from the network manager 180 is ignored if a sensor 160 detects occupancy of an area within the coverage of the sensor 160. As another example, an operational protocol 133 can only allow programming access to the controller 104 with a direct physical connection to the controller 104, and prevent a user 150 (e.g., a hacker) from remotely accessing and/or programming the controller 104 or any portion thereof.

Another example of an operational protocol 133 can be ungraded firmware for the controller 104 (or components thereof) to boot from. When the firmware is updated, a copy of the old firmware can be stored in the storage repository and recalled in the event that the upgraded firmware is or becomes corrupted. Any upgrades to the firmware of the controller 104 may include security keys and/or other measures to ensure that the firmware is being received from an approved, reliable user 150.

Sensor data 134 can be any data associated with (e.g., collected by) each sensor 160 that is communicably coupled to the controller 104. Such data can include, but is not limited to, a manufacturer of the sensor 160, a model number of the sensor 160, communication capability of a sensor 160, power requirements of a sensor 160, and measurements taken by the sensor 160. Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the communication protocols 132, the operational protocols 133, and/or the sensor data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the network manager 180, and the sensors 160 in the system 100. More specifically, the control engine 106 sends information to and/or receives information from the storage repository 130 in order to communicate with the user 150, the network manager 180, and the sensors 160. As discussed below, the storage repository 130 can also be operatively connected to the communication module 108 in certain example embodiments.

In certain example embodiments, the control engine 106 of the controller 104 controls the operation of one or more components (e.g., the communication module 108, the real-time clock 110, the transceiver 124, the relay 136) of the controller 104. For example, the control engine 106 can activate the communication module 108 when the communication module 108 is in "sleep" mode and when the communication module 108 is needed to send data received from another component (e.g., a sensor 160, the user 150) in the system 100. As another example, the control engine 106 can operate one or more portions of one or more relays 136 to control an amount of final power delivered by the power supply 140 to the light sources 142.

As another example, the control engine 106 can acquire the current time using the real-time clock 110. The real time clock 110 can enable the controller 104 to control the light fixture 102 even when the controller 104 has no communication with the network manager 180. As yet another example, the control engine 106 can direct the energy metering module 111 to measure and send power consumption information of the light fixture 102 to the network manager 180. In some cases, the control engine 106 of the controller 104 can generate and send a dimming signal (e.g., 0-10 V DC) to the power supply 140, which causes the power supply 140 to adjust the light output of the light sources 142. In other words, the dimming signal from the control engine 106 to the power supply 140 instructs the power supply 140 to deliver a certain amount of final power to the light sources 142, and this amount of final power corresponds to the amount of light output by the light sources 142.

The control engine 106 can be configured to perform a number of functions that help ensure the fail-safe operation of the controller 104 during any of a number of adverse conditions or events. For example, the control engine 106 can gradually reduce the power output by the power supply 140 to a minimal level when the temperature (measured by a sensor 160) within the cavity 101 of the light fixture 102, as formed by the housing 103, exceeds a certain threshold temperature. As another example, the control engine 106 can calibrate a sensor 160 to account for dust accumulation on the sensor 160 over time. This can be accomplished, for example, by capturing values measured by the sensor 160 with little or no dust accumulation (e.g., when newly installed), capturing values measured by the sensor 160 over time, and tracking changes in the measured values over time. In such a case, the control engine 106 of the controller 104 can send an alarm to the user 150 when the dust accumulation on the sensor 160 reaches a certain level, where the alarm instructs the user 150 to clean the sensor 160.

As another example, the control engine 106 can check one or more communication links 105 between the controller 104 and the network manager 180 and, if a communication link 105 is not functioning properly, allow the controller 104 to operate autonomously from the rest of the system 100. As yet another example, the control engine 106 can store configurations of the controller 104 (or portions thereof) in memory 122 (e.g., non-volatile memory) so that the controller 104 (or portions thereof) can operate regardless of whether the controller 104 is communicating with the network controller 180 and/or other components in the system 100. As still another example, the control engine 106 can obtain readings from an adjacent sensor (as from an adjacent light fixture) if the sensor 160 associated with the light fixture 102 malfunctions, if the communication link 105 between the sensor 160 and the controller 104 fails, and/or for any other reason that the readings of the sensor 160 associated with the light fixture 102 fails to reach the controller 104. To accomplish this, for example, the network manager 180 can instruct, upon a request from the control engine 106, the adjacent sensor 160 to communicate its readings to the control engine 106 of the controller 104 using communication links 105.

As yet another example, the control engine 106 can identify an adverse operating condition or event (e.g., overvoltage, undervoltage, voltage spikes, power surges) based on readings taken by part of the light fixture 102 (e.g., control engine 106, the power supply 140). In such a case, the readings are captured using metering, and such metering capabilities can be included in the control engine 106. If such metering fails, the control engine 106 can be configured to run a failure mode analysis without using the readings from the failed metering. In addition, or in the alternative, the control engine 106 can report the failed metering to the network manager 180. As still another example, the control engine 106 can cause the controller 104 to operate in an autonomous control mode if one or more components (e.g., the communication module 108, the transceiver 124) of the controller 104 that allows the controller 104 to communicate with another component of the system 100 fails.

The control engine 106 can also be configured to thwart efforts by unauthorized users (hackers) to access the controller 104 and/or some other component of the system 100. For example, the control engine 106 can ignore a dimming signal sent to the power supply 140 from the controller 104 if a sensor 160 detects occupancy in an area where light emitted from the light sources 142 of the light fixture 102 is shown. As another example, the control engine 106 can only allow the controller 104 (or portions thereof) to be accessed and/or reprogrammed with a direct physical connection to the controller 104, and so prevent a user 150 (e.g., a hacker) from remotely accessing and/or programming the controller 104 or any portion thereof.

In certain example embodiments, the control engine 106 can serve to convey a dimming function to the power supply 140. For example, if a user 150 sends an instruction to adjust the light output of the light source 142, the control engine 106, either on its own or using one or more relays 136, can send a signal to the power supply 140 that instructs the power supply 140 to adjust the amount of final power delivered by the power supply 140 to the light sources 142 so that the light emitted by the light sources 142 corresponds to the dimming level requested by the control engine 106. In any case, when the control engine 106 controls the power supply 140, the control engine 106 can use data (e.g., threshold values, sensor data 134, operational protocols 133) stored in the storage repository 130.

The control engine 106 can provide control, communication, and/or other similar signals to the user 150, the network manager 180, and one or more of the sensors 160. Similarly, the control engine 106 can receive control, communication, and/or other similar signals from the user 150, the network manager 180, and one or more of the sensors 160. The control engine 106 can control each sensor 160 automatically (for example, based on one or more algorithms stored in the control engine 106) and/or based on control, communication, and/or other similar signals received from another device through a communication link 105. The control engine 106 may include a printed circuit board, upon which the hardware processor 120 and/or one or more discrete components of the controller 104 are positioned.

In certain example embodiments, the control engine 106 can include an interface that enables the control engine 106 to communicate with one or more components (e.g., power supply 140) of the light fixture 102. For example, if the power supply 140 of the light fixture 102 operates under IEC Standard 62386, then the power supply 140 can include a digital addressable lighting interface (DALI). In such a case, the control engine 106 can also include a DALI to enable communication with the power supply 140 within the light fixture 102. Such an interface can operate in conjunction with, or independently of, the communication protocols 132 used to communicate between the controller 104 and the user 150, the network manager 180, and the sensors 160.

The control engine 106 (or other components of the controller 104) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

By using the control engine 106 as described herein, the controller 104 can operate in a fail-safe mode, causing the light sources 142 to illuminate in spite of an adverse condition or event (e.g., wireless network formation time when power comes back ON after a power outage, failure of a component of the controller 104, hacking, dust accumulation on a sensor 160, loss of communication with the network manager 180). In other words, if an adverse condition or event that affects the operation of the light fixture 102 or any portion thereof arises, including the control engine 106, the controller 104 ensures that the light sources 142 of the light fixture 102 emit light.

The communication module 108 of the controller 104 determines and implements the communication protocol (e.g., from the communication protocols 132 of the storage repository 130) that is used when the control engine 106 communicates with (e.g., sends signals to, receives signals from) the user 150, the network manager 180, and/or one or more of the sensors 160. In some cases, the communication module 108 accesses the sensor data 134 to determine which communication protocol is used to communicate with the sensor 160 associated with the sensor data 134. In addition, the communication module 108 can interpret the communication protocol of a communication received by the controller 104 so that the control engine 106 can interpret the communication.

The communication module 108 can send and receive data between the network manager 180 or users 150 and the controller 104. The communication module 108 can send and/or receive data in a given format that follows a particular communication protocol 132. The control engine 106 can interpret the data packet received from the communication module 108 using the communication protocol 132 information stored in the storage repository 130. The control engine 106 can also facilitate the data transfer between one or more sensors 160 and the network manager 180 or a user 150 by converting the data into a format understood by the communication module 108.

The communication module 108 can send data (e.g., communication protocols 132, operational protocols 133, sensor data 134, operational information, error codes) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The real-time clock 110 of the controller 104 can track clock time, intervals of time, an amount of time, and/or any other measure of time. The real-time clock 110 can also count the number of occurrences of an event, whether with or without respect to time. Alternatively, the control engine 106 can perform the counting function. The real-time clock 110 is able to track multiple time measurements concurrently. The real-time clock 110 can track time periods based on an instruction received from the control engine 106, based on an instruction received from the user 150, based on an instruction programmed in the software for the controller 104, based on some other condition or from some other component, or from any combination thereof.

The real-time clock 110 can be configured to track time when there is no power delivered to the controller 104 (e.g., the power module 112 malfunctions) using, for example, a super capacitor or a battery backup. In such a case, when there is a resumption of power delivery to the controller 104, the real-time clock 110 can communicate any aspect of time to the controller 104. In such a case, the real-time clock 110 can include one or more of a number of components (e.g., a super capacitor, an integrated circuit) to perform these functions.

The energy metering module 111 of the controller 104 measures one or more components of power (e.g., current, voltage, resistance, VARs, watts) at one or more points within the light fixture 102. The energy metering module 111 can include any of a number of measuring devices and related devices, including but not limited to a voltmeter, an ammeter, a power meter, an ohmmeter, a current transformer, a potential transformer, and electrical wiring. The energy metering module 111 can measure a component of power continuously, periodically, based on the occurrence of an event, based on a command received from the control engine 106, and/or based on some other factor.

The power module 112 of the controller 104 provides power to one or more other components (e.g., real-time clock 110, control engine 106) of the controller 104. In addition, in certain example embodiments, the power module 112 can provide power (e.g., secondary power) to the power supply 140 of the light fixture 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112, Alternatively, the controller 104 can use the energy metering module 111 to measure one or more elements of power that flows into, out of, and/or within the controller 104.

The power module 112 can include one or more components (e.g., a transformer, a diode bridge, an inverter, a converter) that receives power (for example, through an electrical cable) from a source external to the light fixture 102 and generates power of a type (e.g., alternating current, direct current) and level (e.g., 12V, 24V, 120V) that can be used by the other components of the controller 104 and/or by the power supply 140. In addition, or in the alternative, the power module 112 can be a source of power in itself to provide signals to the other components of the controller 104 and/or the power supply 140. For example, the power module 112 can be a battery or other form of energy storage device. As another example, the power module 112 can be a localized photovoltaic power system. The power module 112 can also have sufficient isolation in the associated components of the power module 112 (e.g., transformers, opto-couplers, current and voltage limiting devices) so that the power module 112 is certified to provide power to an intrinsically safe circuit.

In certain example embodiments, the power module 112 of the controller 104 can also provide power and/or control signals, directly or indirectly, to one or more of the sensors 160. In such a case, the control engine 106 can direct the power generated by the power module 112 to the sensors 160 and/or the power supply 140 of the light fixture 102. In this way, power can be conserved by sending power to the sensors 160 and/or the power supply 140 of the light fixture 102 when those devices need power, as determined by the control engine 106.

The hardware processor 120 of the controller 104 executes software, algorithms, and firmware in accordance with one or more example embodiments. Specifically, the hardware processor 120 can execute software on the control engine 106 or any other portion of the controller 104, as well as software used by the user 150, the network manager 180, and/or one or more of the sensors 160. The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120. Alternatively, FPGAs, IGBTs, ICs, and/or similar devices can be used in conjunction with one or more hardware processors 120.

The transceiver 124 of the controller 104 can send and/or receive control and/or communication signals. Specifically, the transceiver 124 can be used to transfer data between the controller 104 and the user 150, the network manager 180, and/or the sensors 160. The transceiver 124 can use wired and/or wireless technology. The transceiver 124 can be configured in such a way that the control and/or communication signals sent and/or received by the transceiver 124 can be received and/or sent by another transceiver that is part of the user 150, the network manager 180, and/or the sensors 160. The transceiver 124 can use any of a number of signal types, including but not limited to radio signals.

When the transceiver 124 uses wireless technology, any type of wireless technology can be used by the transceiver 124 in sending and receiving signals. Such wireless technology can include, but is not limited to, Wi-Fi, visible light communication, cellular networking, and Bluetooth. The transceiver 124 can use one or more of any number of suitable communication protocols (e.g., ISA100, HART) when sending and/or receiving signals. Such communication protocols can be stored in the communication protocols 132 of the storage repository 130. Further, any transceiver information for the user 150, the network manager 180, and/or the sensors 160 can be part of the sensor data 134 (or similar areas) of the storage repository 130.

Optionally, in one or more example embodiments, the security module 128 secures interactions between the controller 104, the user 150, the network manager 180, and/or the sensors 160. More specifically, the security module 128 authenticates communication from software based on security keys verifying the identity of the source of the communication. For example, user software may be associated with a security key enabling the software of the user 150 to interact with the controller 104 and/or the sensors 160. Further, the security module 128 can restrict receipt of information, requests for information, and/or access to information in some example embodiments.

As mentioned above, aside from the controller 104 and its components, the light fixture 102 can include a power supply 140, one or more light sources 142, and an optional relay 136. The light sources 142 of the light fixture 102 are devices and/or components typically found in a light fixture to allow the light fixture 102 to operate. A light fixture component 142 can be electrical, electronic, mechanical, or any combination thereof. The light fixture 102 can have one or more of any number and/or type of light sources 142. Examples of such light sources 142 can include, but are not limited to, a local control module, a light source, a light engine, a heat sink, an electrical conductor or electrical cable, a terminal block, a lens, a diffuser, a reflector, an air moving device, a baffle, a dimmer, and a circuit board.

The power supply 140 of the light fixture 102 receives power (e.g., primary power, secondary power) from an external source (e.g., a wall outlet, an energy storage device). The power supply 140 uses the power it receives to generate and provide power (called also final power herein) to one or more of the light sources 142. The power supply 140 can be called by any of a number of other names, including but not limited to a driver, a LED driver, and a ballast. The power supply 140 can be substantially the same as, or different than, the power module 112 of the controller 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned, and/or a dimmer.

The power supply 140 can include one or more components (e.g., a transformer, a diode bridge, an inverter, a converter) that receives power (for example, through an electrical cable) from the power module 112 of the controller 104 and generates power of a type (e.g., alternating current, direct current) and level (e.g., 12V, 24V, 120V) that can be used by the light sources 142. In addition, or in the alternative, the power supply 140 can receive power from a source external to the light fixture 102. In addition, or in the alternative, the power supply 140 can be a source of power in itself. For example, the power supply 140 can be a battery, a localized photovoltaic power system, or some other source of independent power.

The relay 136 can be and/or include any type of switch that is used to ensure that power is delivered to the power supply 140 so that the light sources 142 are fully illuminated when there is a disruption or adverse event (e.g., power outage, misappropriation of control of the light fixture 102) in the normal or expected operation of the light fixture 102. The relay 136 can be solid state, electro-mechanical, or some combination thereof. The relay 136 can include a contact (e.g., contact 537 in FIG. 5 below) and a coil (e.g., coil 538 in FIG. 5 below) that is electrically coupled to a dimming signal that originates from the control engine 106. When a disruption in the normal or expected operation of the light fixture 102 occurs, the coil of the relay 136 changes states (e.g., becomes de-energized), which opens the contact of the relay 136. When the contact of the relay 136 is open, the dimming interface of the power supply 140 senses a high input impedance. The high input impedance at the dimming interface of the power supply 140 automatically delivers full power to the light sources 142, which leaves the light sources 142 fully illuminated until the contact of the relay 136 recloses, which maintains a low impedance dimming connection. More details about the relay 136 are provided below with respect to FIG. 5.

As stated above, the light fixture 102 can be placed in any of a number of environments. In such a case, the housing 102 of the light fixture 102 can be configured to comply with applicable standards for any of a number of environments. For example, the light fixture 102 can be rated as a Division 1 or a Division 2 enclosure under NEC standards. Similarly, any of the sensors 160 or other devices communicably coupled to the light fixture 102 can be configured to comply with applicable standards for any of a number of environments. For example, a sensor 160 can be rated as a Division 1 or a Division 2 enclosure under NEC standards.

Figure 2:
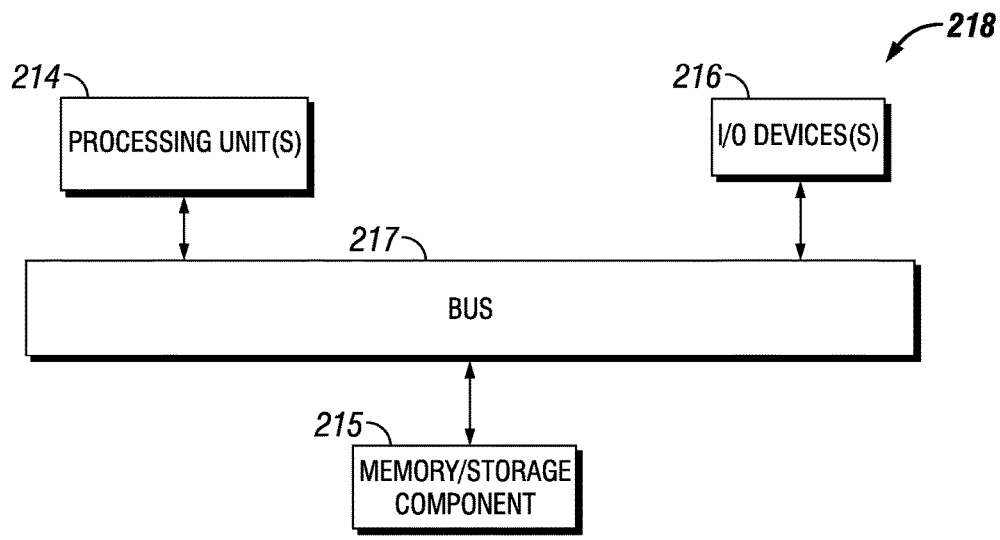
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain example embodiments. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a local area network (LAN), a wide area network (WAN) such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain example embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 3:
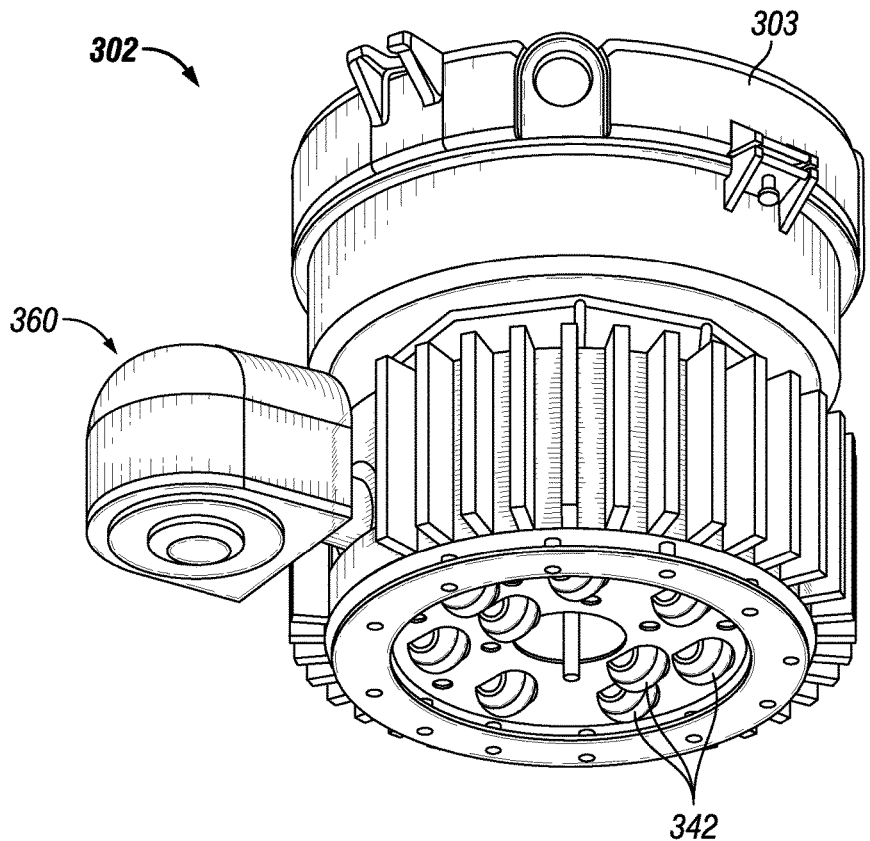
FIG. 3 shows a light fixture in accordance with certain example embodiments.

FIG. 3 shows a light fixture 302 in accordance with certain example embodiments. Referring to FIGS. 1-3, the light fixture 302 of FIG. 3 is the physical embodiment of the light fixture 102 of FIG. 1. The light fixture 302 of FIG. 3 includes a housing 303, a number of light sources 342, and a sensor 360 coupled to the housing 303.

Figure 4:
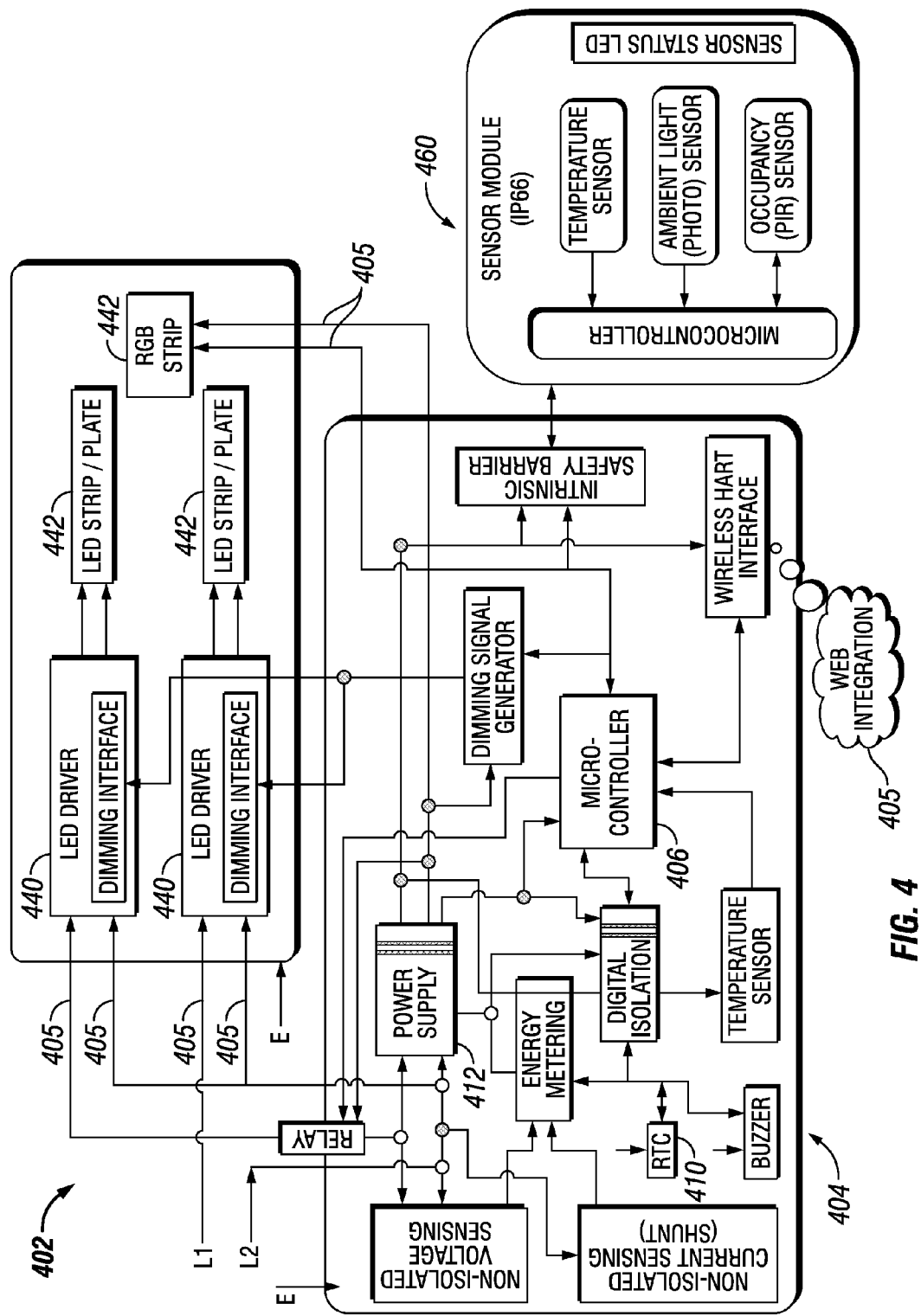
FIG. 4 shows a system diagram of a light fixture in accordance with certain example embodiments.

FIG. 4 shows a system diagram of a light fixture 402 in accordance with certain example embodiments. Referring to FIGS. 1-4, the light fixture 402 of FIG. 4 is substantially similar to the light fixture 102 of FIG. 1, except that the internal connections (communication links 405) are shown between various components between and within the controller 404, the sensor 460, the power supply 440, and the light sources 442. The controller 404 includes the relay 436, the control engine 406, the power module 412, and the real-time clock 410. Although not shown in FIG. 4, light fixture 402 of FIG. 4 includes a housing 303, a number of light sources 342, and a sensor 360 coupled to the housing 303. In this case, relay 436 is used to act as an on/off switch with respect to power delivered from the power supplies 440.

Figure 5:
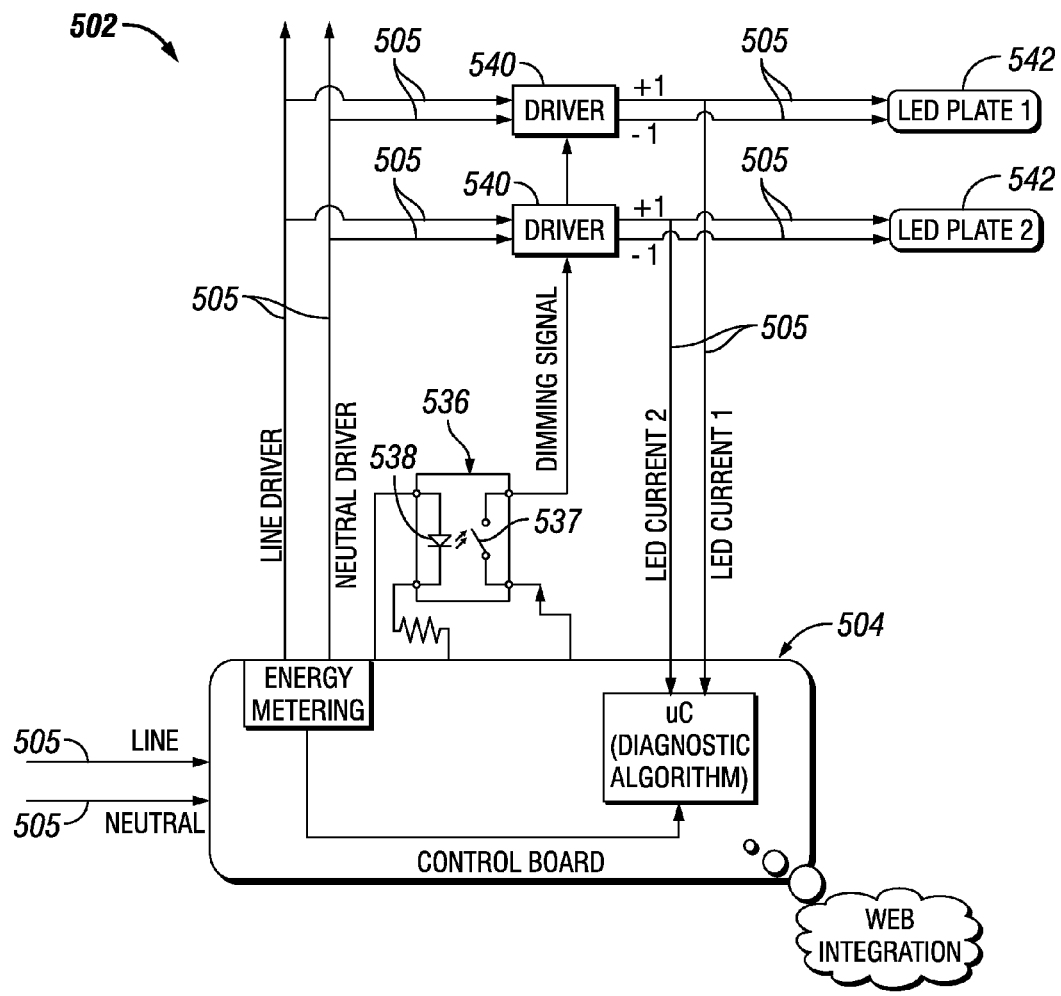
FIG. 5 shows a system diagram of another light fixture in accordance with certain example embodiments.
Figure 6A:
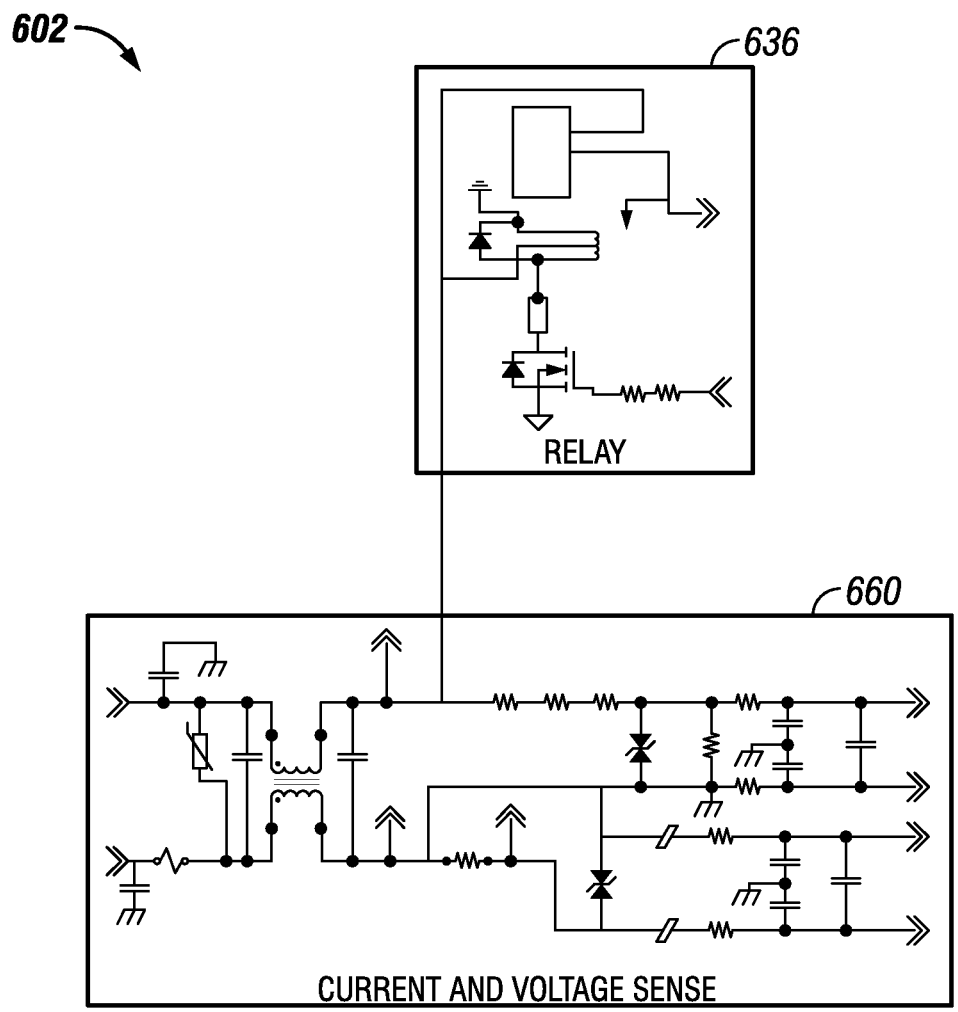
FIGS. 6A-6E show an example electrical schematic of a light fixture in accordance with certain example embodiments.
Figure 6B:
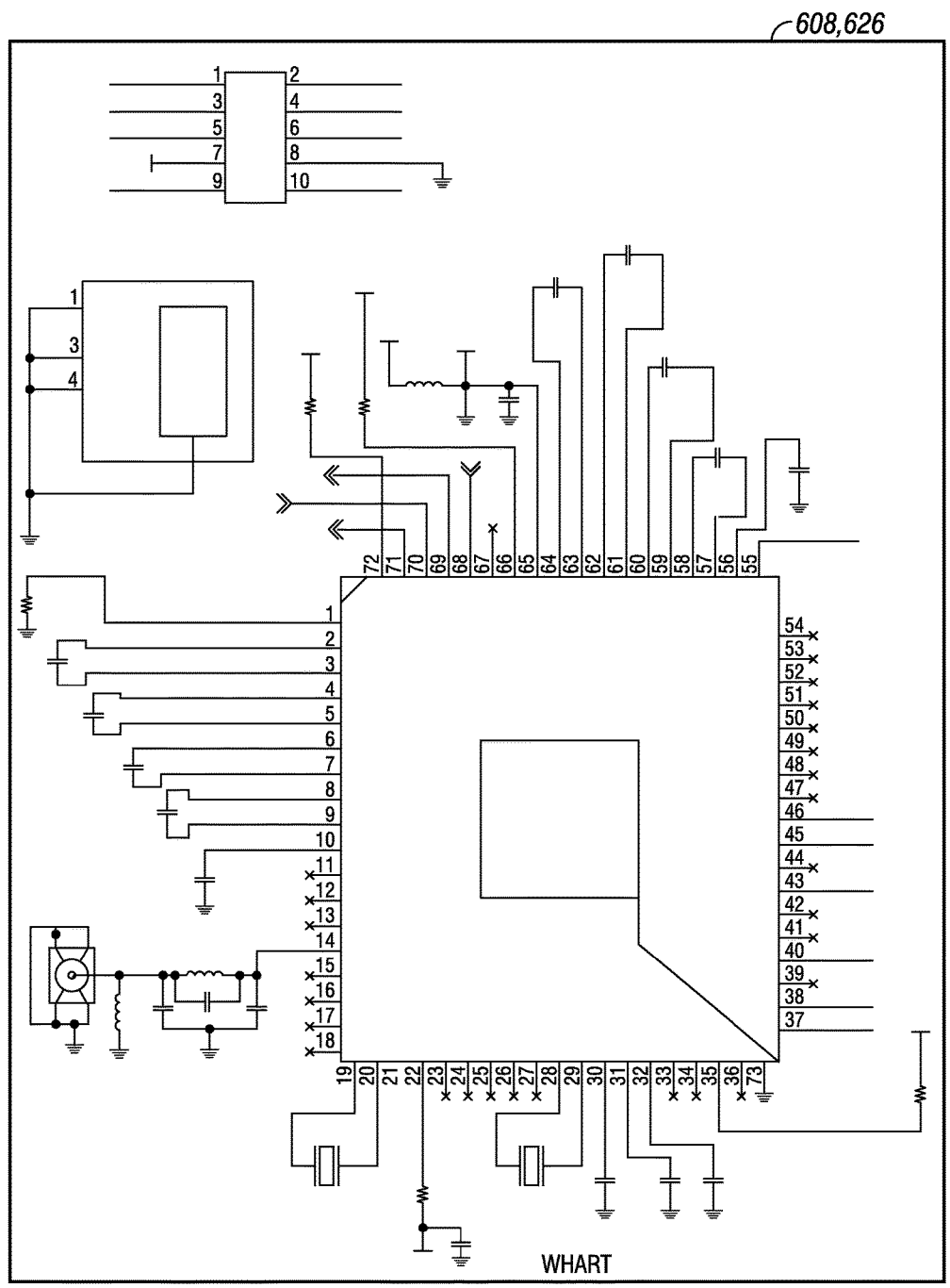
Figure 6C:
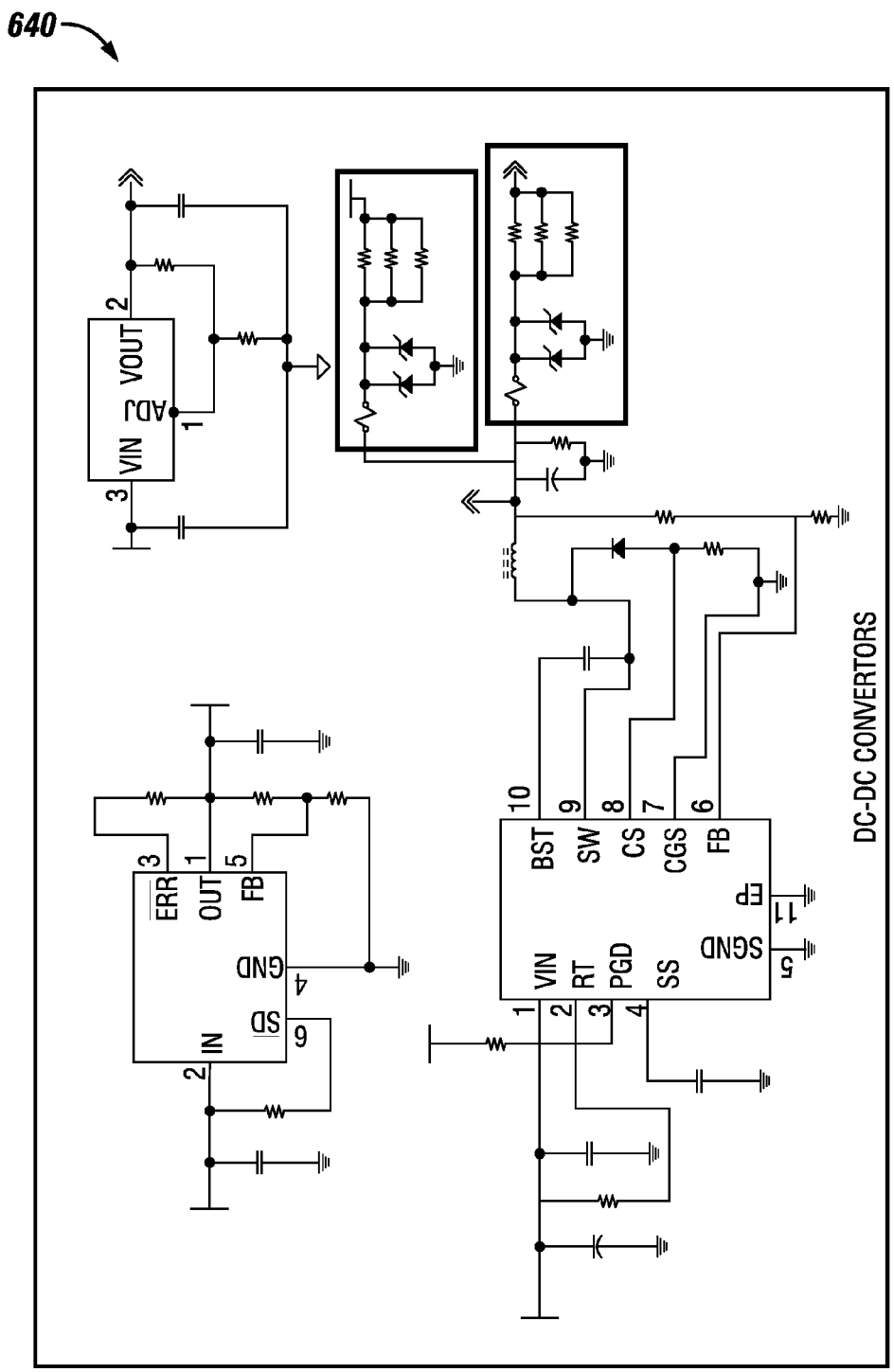
Figure 6D:
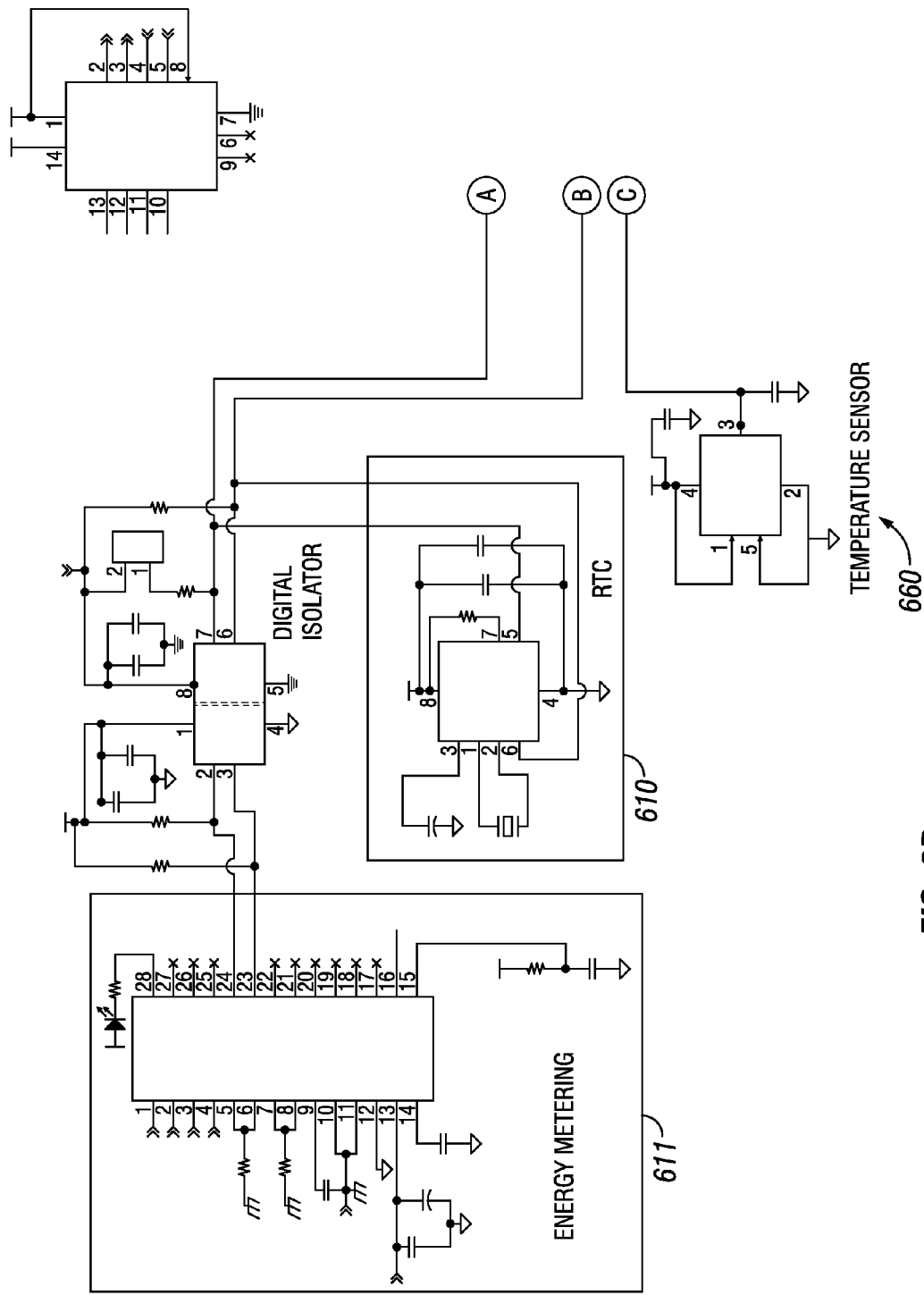
Figure 6E:
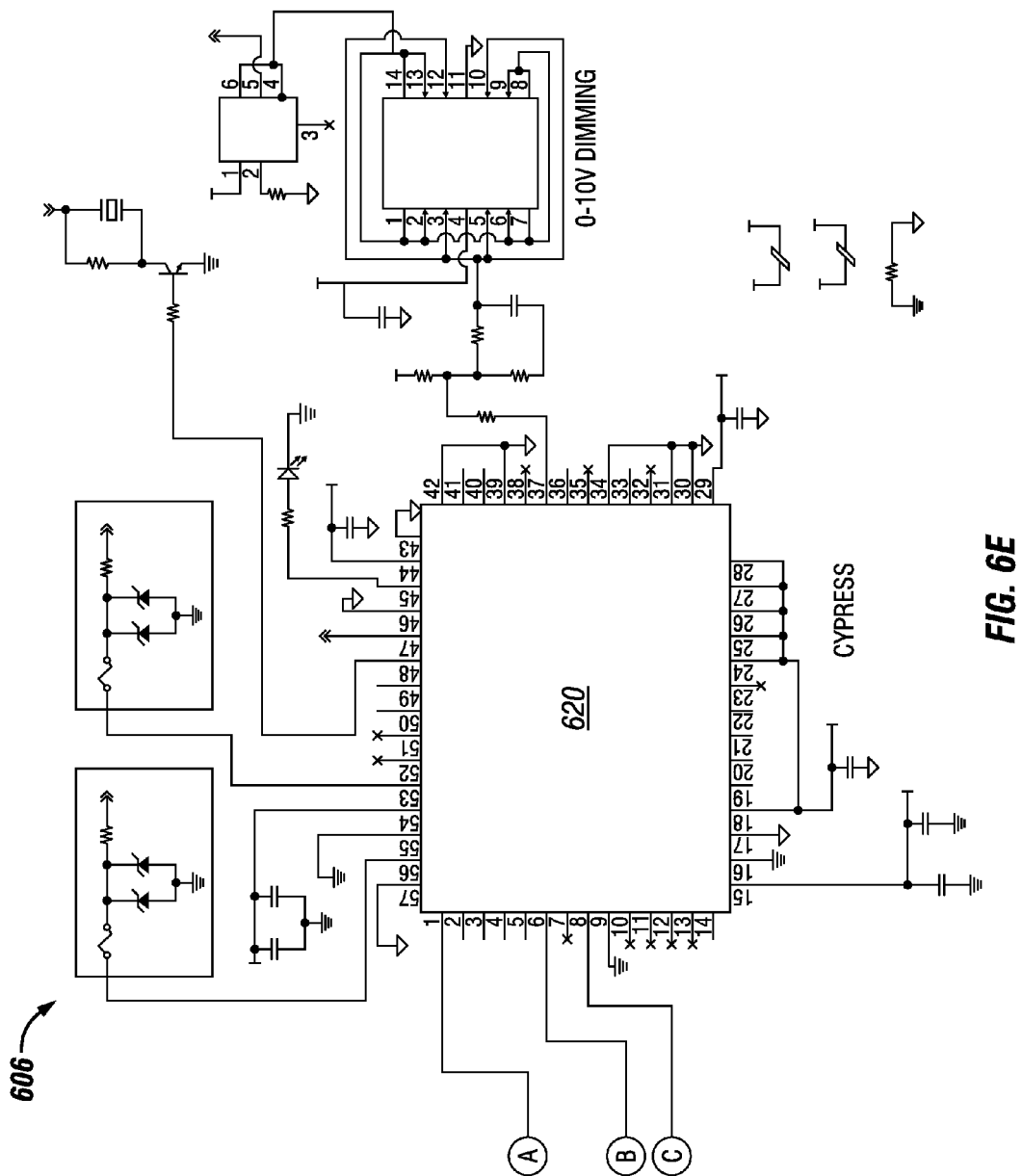

FIG. 5 shows a system diagram of another light fixture 502 in accordance with certain example embodiments. Referring to FIGS. 1-5, the light fixture 502 of FIG. 5 is substantially similar to the light fixture 402 of FIG. 4, except that the relay 536 serves a different purpose compared to the relay 436 of FIG. 4. Specifically, the relay 536 of FIG. 5 provides high impedance to the dimmer interface of the power supplies 540 when the controller 504 fails. In this case, the relay 536 includes a contact 537 (or, in some cases, a photo switch 537) and a coil 538 (or, in some cases, a LED 538). Generally speaking, the coil 538 of the relay 536 has an enabled state (e.g., energized, illuminated) and a disabled state (e.g., de-energized, not illuminated). The contact 537 has an open state and a closed state. When the coil 538 is in an enabled state, the contact 537 is in one state (e.g., closed). When the coil 538 is in a disabled state, the contact 537 is in the other state (e.g., open).

In this particular configuration, the contact 537 of the relay 536 is electrically coupled to the 0-10 VDC dimming signal generated by the controller 504 and the power supplies 540, which receive power via links 505 and generate an amount of final power that corresponds to the dimming signal and is used to adjust the light emitted by the light sources 542 based on the dimming level. Also, the coil 538 of the relay 536 is electrically coupled to a power terminal of the controller 504. When the controller 504 (or, more specifically, the control engine) is operating normally, the power terminal of the controller 504 sends voltage through the coil 538 of the relay 536 and puts the coil 538 in the enabled state. In this case, the coil 538 is a LED 538 and is illuminated in the enabled state, which causes the contact 537 to be closed. With the contact 537 closed, the 0-10 VDC dimming signal flows from the controller 504, through the closed contact 537, and to the power supplies 540.

When the controller 504 loses power, malfunctions, or otherwise stops functioning, the power terminal of the controller 504 has no voltage. As a result, the coil 538 of the relay 536 is in the disabled state. As a result, the 0-10 VDC dimming signal generated by the controller 504 does not reach the power supplies 540. Consequently, the power supplies 540 assume no dimming, and so direct the light sources 542 to emit full light output. In this way, if the controller 504 malfunctions, the relay 536 ensures that the light sources 542 emit full light output. In certain example embodiments, the relay 536 is an optical device, and so does not have the possibility of arcing or sparking. As such, the relay 536 can safely be used in a hazardous environment.

FIGS. 6A-6E show an example electrical schematic of a light fixture 602 in accordance with certain example embodiments. Specifically, referring to FIGS. 1-6E, the light fixture 602 of FIGS. 6A-6E shows example circuits for a number of sensors 660 (in this case, a current/voltage sensor and a temperature sensor), a relay 636, a portion of a power supply 640, a real-time clock 610, a control engine 606 (including a hardware processor 620), an energy metering module 611, and a combination of a communication module 608 and an application interface 626. Each of these components of the light fixture 602 can include one or more of a number of components, including but not limited to resistors, capacitors, inductors, transformers, ICs, transistors, diodes, opto-couplers, fuses, and varistors. Any of the components of the light fixture 602 shown in FIGS. 6A-6E can have any variety of different configurations and/or components.

FIGS. 7-10 show flow charts of how a controller controls a light fixture in accordance with certain example embodiments. While the various steps in these flowcharts are presented and described sequentially, one of ordinary skill in the art will appreciate that some or all of the steps are executed in different orders, combined or omitted, and some or all of the steps are executed in parallel depending upon the example embodiment. Further, in one or more of the example embodiments, one or more of the steps described below are omitted, repeated, and/or performed in a different order. In addition, a person of ordinary skill in the art will appreciate that additional steps, not shown in FIGS. 7-10, can be included in performing these methods in certain example embodiments. Accordingly, the specific arrangement of steps should not be construed as limiting the scope. In addition, a particular computing device, as described, for example, in FIG. 2 above, can be used to perform one or more of the steps for the methods of FIGS. 7-10, or any other methods described or inferred herein.

Figure 7:
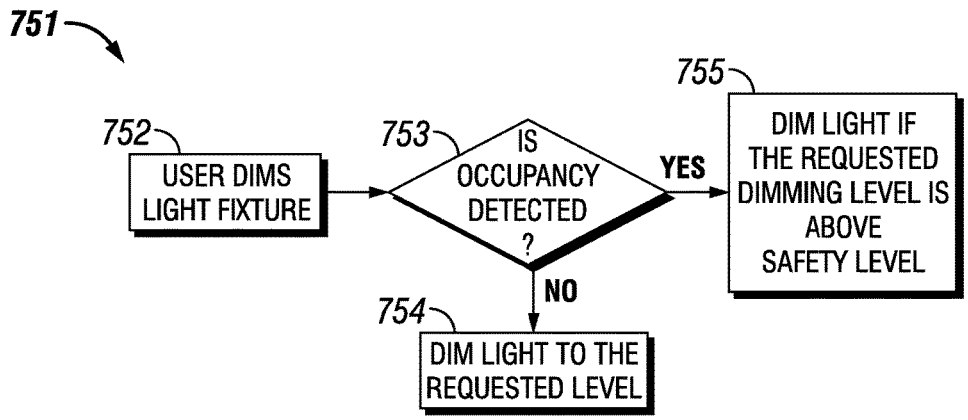
FIGS. 7-10 show flow charts of how a controller controls a light fixture in accordance with certain example embodiments.

Referring to FIGS. 1-10, the method 751 of FIG. 7 starts at step 752, where a user (e.g., user 150) dims the light output of the light source (e.g., light source 142) of the light fixture (e.g., light fixture 102). For example, the user, using a user interface (e.g., a digital controller, a dial, a slidebar), can manipulate a dimmer selection to instruct the controller (e.g., controller 104) as to an adjustment in the amount of light output by the light source.

In step 753, when the controller receives the dimming instruction from the user, the controller determines whether there is occupancy in a space in which the light fixture is located. The controller can determine whether there is occupancy in a space in which the light fixture is located using one or more of a number of components (e.g. a sensor 160) of the light fixture. If there is no occupancy detected in the space, then the process proceeds to step 754, where the controller controls the power supply (e.g., power supply 140) according to the dimming instruction. When this occurs, the power supply delivers an adjusted level of final power to the light source, which in turn adjusts the light output of the light source to a level that corresponds to the dimming level requested by the user.

On the other hand, if there is occupancy detected in the space, then the process proceeds to step 755, where the controller determines whether the level of dimming requested by the user is above a threshold value (e.g., as stored in the storage repository 130). If the level of dimming requested by the user is above a threshold value, then the controller controls the power supply (e.g., power supply 140) according to the dimming instruction. When this occurs, the power supply delivers an adjusted level of final power to the light source, which in turn adjusts the light output of the light source to a level that corresponds to the dimming level requested by the user.

On the other hand, if the level of dimming requested by the user is below a threshold value, then the controller ignores the dimming instruction from the user. Alternatively, if the level of dimming requested by the user is below a threshold value, then the controller sets the dimming level at the threshold value. In other words, the controller instructs the power supply (e.g., power supply 140) to deliver an adjusted level of final power to the light source, which in turn adjusts the light output of the light source to a level that corresponds to the threshold value.

The threshold value in this case can be a safety value that requires a light fixture to emit a minimal amount of light when a space is occupied so that the occupants have enough light to see. Such a threshold value can be installed in firmware in such a way that a user cannot alter the threshold value. Alternatively, the threshold value can be adjusted by a user. Also, the controller can use one or more other sensors (e.g., a photocell) to determine an amount of ambient light in the space. In certain example embodiments, if the amount of ambient light in the space is above the threshold value, then the dimming instruction from the user may be followed rather than ignored.

Figure 8:
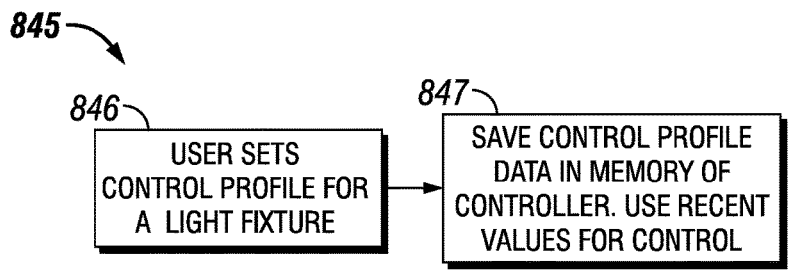

The method 845 of FIG. 8 begins at step 846, where a control profile for the light fixture is set by a user. The control profile can include any of a number of types of data. Examples of such data can include, but are not limited to, a dimming threshold level with occupancy, a dimming threshold level without occupancy, occupancy delay time, and time zone in which the light fixture is located. Once the control profile is received, the process proceeds to step 847, where the control profile is stored in the storage repository (e.g., storage repository 130). This control profile is then used by the control engine to control the power supply 140. In some cases, the control profile (or portions thereof) can be altered at any time, as by a user or by the control engine based on historical data. Alternatively, the user can be the manufacturer, and the control profile (or portions thereof) can remain unchanged once the light fixture leaves the manufacturer.

Figure 9:
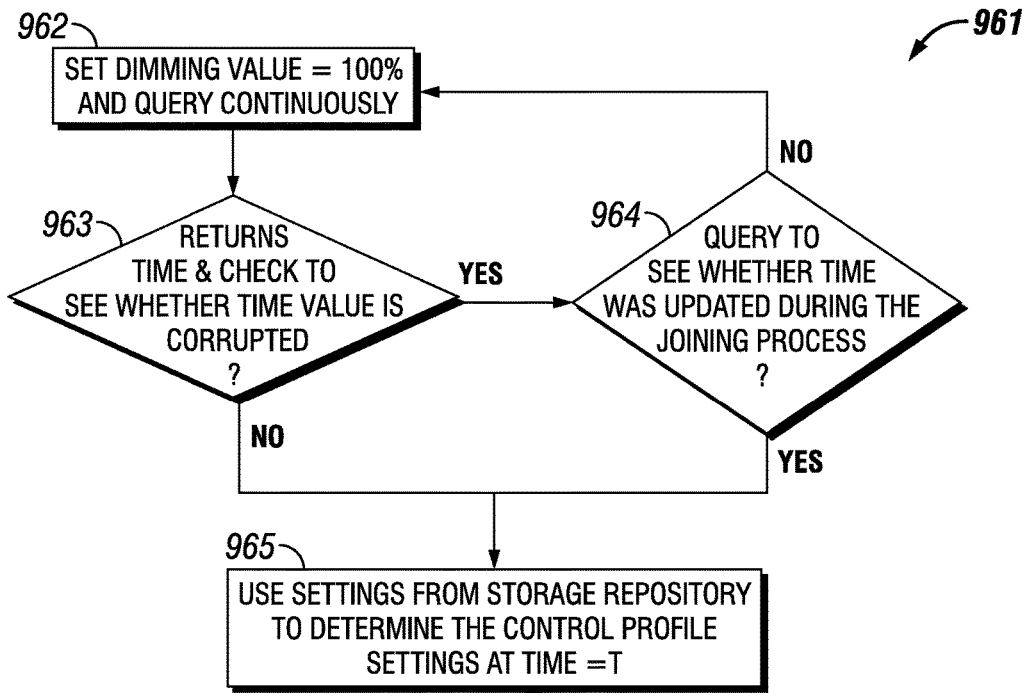

The method 961 of FIG. 9 shows what can happen, using example embodiments, during a brown out or black out. In step 962 of the method 961, once the energy metering module (e.g., energy metering module 111) determines that the primary power delivered to the controller (e.g., controller 104) and/or the power supply (e.g., power supply 140) has been interrupted, the controller can set the dimming value at 100% (i.e., the light sources emit the maximum amount of light that they are capable of emitting). Further, in some cases, the controller 104 can use the energy metering module on some basis (e.g., continuously, periodically) to determine when the brown out or black out condition has ended. In addition, the controller 104 can, upon determining that a brown out or black out has occurred, use a secondary source of power (e.g., a supercapacitor) to continue to provide power to the real-time clock (e.g., real-time clock 110). In this way, the time value of the real-time clock is less likely to get corrupted.

In step 963, the controller can use the real-time clock (e.g., real-time clock 110) to verify a time value associated with the brown out/black out condition and determine whether the time value has been corrupted. If the time value has not been corrupted, the process proceeds to step 965, where the controller uses settings stored in the storage repository (e.g., storage repository 130) to determine the control profile settings at the time of the brown out/black out.

If the time value has been corrupted, the process proceeds to step 964, where the controller determines whether the time of the real-time clock was updated during the joining process. If the time was updated during the joining process, then the process proceeds to step 965, discussed above. If the time was not updated during the joining process, then the process reverts to step 962, discussed above.

Figure 10:
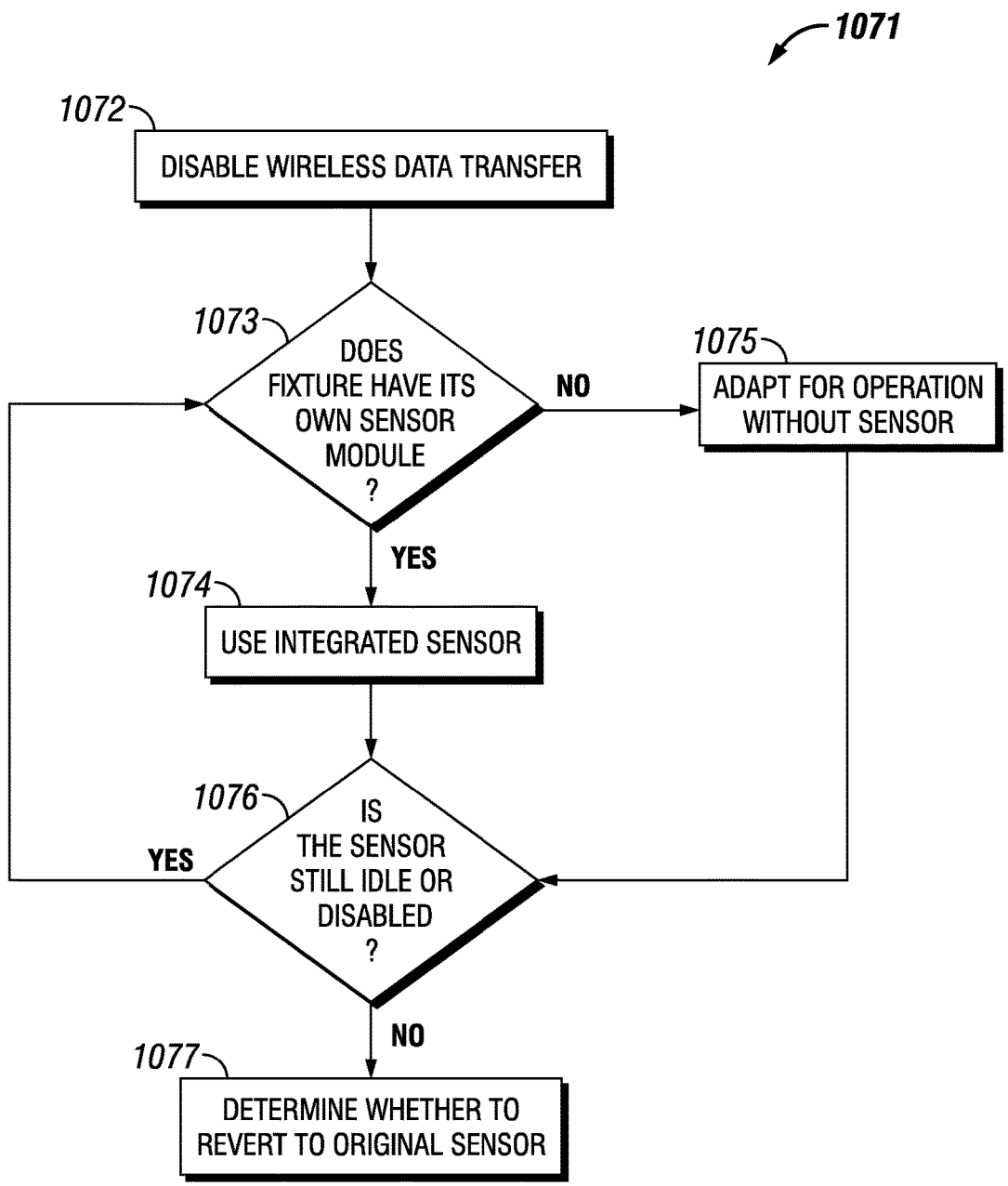

The method 1071 of FIG. 10 shows what can happen, using example embodiments, when a sensor (e.g., sensor 160) goes idle or loses communication with the controller (e.g., due to failure of a communication link (e.g., communication link 105)). In step 1072, the controller (e.g., controller 104) disables the wireless data transfer with the sensor. In step 1073, the controller determines whether the light fixture has its own sensor that can perform the same functions (or equivalents thereof) as the disabled sensor. If the light fixture has its own sensor, then the controller uses the sensor integrated with the light fixture. In such a case, the controller can use the sensor data for the integrated sensor that is saved in the storage repository.

If the light fixture does not have its own sensor, then the process proceeds to step 1075, where the controller adapts for operation without the disabled sensor. For example, if the disabled sensor is associated with detection of light levels, then the controller can disable daylight harvesting from its mode of operation and instead shift to a time schedule mode. As another example, if the disabled sensor is associated with occupancy, then the controller can assume that there is always someone present in the space associated with the light fixture.

After step 1074 or step 1075 have been completed, the process proceeds to step 1076, where a determination is made as to whether the sensor continues to be idle or lack communication with the controller. If the sensor continues to be disabled, then the process reverts to step 1073. If the sensor is no longer disabled, then the process proceeds to step 1077, where the controller determines whether to revert to using the previously-disabled sensor or maintain operations with the integrated sensor. This determination can be made based on one or more of a number of factors, including but not limited to user preferences, one or more protocols, the amount of time that the sensor was disabled, and whether the previously-disabled sensor is fully functional. The controller can test the previously-disabled sensor to determine the extent of functionality of that sensor.

Example embodiments provide for fail-safe lighting control systems for light fixtures. Specifically, certain example embodiments allow for a light fixture to emit full light output when any of a number of adverse events occurs. In this way, example embodiments can eliminate the risk of a light system or portions thereof being hacked. In addition, example embodiments allow for complex control systems with numerous components to be used with a light fixture while maintaining the reliability of the light fixture. In some cases, light fixtures having example fail-safe lighting control systems can be located in particular environments (e.g., a hazardous environment). In such a case, the light fixture can comply with one or more applicable standards for that environment. Communication between a light fixture having example fail-safe lighting control systems and other components (e.g., a user, a sensor, a network manager) of the system can be conducted using wired and/or wireless technology.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A light fixture, comprising:
   at least one light source;
   at least one power supply that receives primary power, wherein the at least one power supply generates final power using the primary power, wherein the at least one power supply delivers the final power to the at least one light source;
   a controller coupled to the at least one power supply, wherein the controller:
   detects a failure of at least one control component, wherein the at least one control component is used to help control operation of the light fixture;
   overrides, upon detecting the failure of the at least one control component, operational protocols involving the at least one control component that has failed; and
   controls, using the operational protocols that have been overridden, the at least one power supply to provide the final power to the at least one light source during the failure of the at least one control component.

2. The light fixture of claim 1, wherein the final power provided by the at least one power supply to the at least one light source during the failure of the at least one control component is a maximum amount of power, wherein the at least one light source uses the maximum amount of power to emit a full light output.

3. The light fixture of claim 2, wherein the controller comprises a switch, wherein the switch of the controller changes state during the failure of the at least one control component, wherein the switch is coupled to the at least one power supply.

4. The light fixture of claim 3, wherein the failure of the at least one control component comprises a malfunction of the controller, wherein the switch changes state automatically during the malfunction of the controller according to the operational protocols that have been overridden.

5. The light fixture of claim 1, wherein the failure of the at least one control component comprises excessive dust accumulation on a sensor, wherein the sensor is coupled to the controller, wherein the excessive dust accumulation on the sensor causes the controller to malfunction.

6. The light fixture of claim 1, wherein the failure of the at least one control component comprises failure of a sensor, wherein the sensor provides measurements to the controller, wherein the controller uses the measurements to determine a light output of the at least one light source.

7. The light fixture of claim 6, further comprising:
   an additional sensor disposed proximate to the at least one light source, wherein the additional sensor provides sensor readings to the controller during the failure of the at least one control component.

8. The light fixture of claim 1, wherein the failure of the at least one control component comprises severed communication between the controller and a network manager.

9. The light fixture of claim 1, wherein the failure of the at least one control component comprises at least one selected from a group consisting of detecting overvoltage, detecting undervoltage, detecting a voltage spike, and detecting a voltage surge.

10. The light fixture of claim 1, wherein the failure of the at least one control component comprises failure of a communication module of the controller.

11. The light fixture of claim 1, wherein the failure of the at least one control component comprises failure of a transceiver of the controller.

12. The light fixture of claim 1, further comprising:
    a housing, wherein the failure of the at least one control component comprises exceeding a threshold temperature within the housing.

13. The light fixture of claim 1, wherein the failure of the at least one control component comprises a failure to meter energy associated with the controller.

14. The light fixture of claim 1, wherein the failure of the at least one control component comprises unauthorized access to the controller.

15. The light fixture of claim 1, further comprising:
    a power module coupled to the controller, wherein the power module comprises an energy storage device capable of delivering secondary power to a real-time clock of the controller.

16. The light fixture of claim 15, wherein the failure of the at least one control component comprises loss of the primary power delivered to the at least one power supply, wherein the energy storage device delivers the secondary power to the real-time clock during the failure of the at least one control component, and wherein the real-time clock maintains a time value during the failure of the at least one control component using the secondary power.

17. The light fixture of claim 1, wherein the failure of the at least one control component comprises a request by a user to dim a light output of the at least one light source below a threshold value when a sensor detects occupancy within a space in which the light output is directed.

18. A lighting system, comprising:
    a first light fixture, comprising:
    at least one first light source; and
    at least one first power supply that receives first primary power, wherein the at least one first power supply generates first final power using the first primary power, wherein the at least one first power supply delivers the first final power to the at least one first light source; and
    a controller coupled to the at least one first power supply, wherein the controller:
    detects a first failure of at least one first control component, wherein the at least one first control component is used to help control operation of the first light fixture;
    overrides, upon detecting the failure of the at least one first control component, operational protocols involving the at least one first control component that has failed; and
    controls, using the operational protocols that have been overridden, the at least one first power supply to provide the first final power to the at least one first light source during the first failure of the at least one first control component.

19. The lighting system of claim 18, further comprising:
a second light fixture, comprising:
  at least one second light source; and
  at least one second power supply that receives second primary power, wherein the at least one second power supply generates second final power using the second primary power, wherein the at least one second power supply delivers the second final power to the at least one second light source,
wherein the controller is further coupled to the at least one second power supply, wherein the controller further;
  detects a second failure of at least one second control component wherein the at least one second control component is used to help control operation of the second light fixture;
  overrides, upon detecting the failure of the at least one second control component, operational protocols involving the at least one second control component that has failed; and
  controls, using the operational protocols that have been overridden, the at least one second power supply to provide the second final power to the at least one second light source during the second failure of at least one second control component.

20. A controller for a light fixture, comprising:
a control engine coupled to a power supply of the light fixture, wherein the controller is configured to:
  detect a failure of at least one control component, wherein the at least one control component is used to help control operation of the light fixture;
  override, upon detecting the failure of the at least one control component, operational protocols involving the at least one control component that has failed; and
  control, using the operational protocols that have been overridden, the power supply to provide final power to at least one first light source of the light fixture during the failure of the at least one control component.

* * * * *